(12) United States Patent
Ishikawa et al.

(10) Patent No.: US 7,511,447 B2
(45) Date of Patent: Mar. 31, 2009

(54) MOTOR DRIVE APPARATUS (75) Inventors: Tetsuhiro Ishikawa, Nishikamo-gun (JP); Yukihiro Minezawa, Anjo (JP)

(73) Assignees: Toyota Jidosha Kabushiki Kaisha, Toyota-shi (JP); Aisin AW Co., Ltd., Anjo-shi (JP)

( * ) Notice: Subject to any disclaimer, the term of this patent is extended or adjusted under 35 U.S.C. 154(b) by 194 days.

(21) Appl. No.: 11/578,241

(22) PCT Filed: May 10, 2005

(86) PCT No.: PCT/JP2005/008848

§ 371 (c)(1),
(2), (4) Date: Oct. 12, 2006

(87) PCT Pub. No.: WO2005/115788

PCT Pub. Date: Dec. 8, 2005

(65) Prior Publication Data
US 2007/0216323 A1    Sep. 20, 2007

(30) Foreign Application Priority Data
May 26, 2004    (JP)    ............................... 2004-156401

(51) Int. Cl.
*H02P 5/34* (2006.01)
*H02P 27/04* (2006.01)
(52) U.S. Cl. ........................ 318/801; 318/139; 318/254; 318/807; 363/37; 363/132
(58) Field of Classification Search ......... 318/800–811, 318/254; 363/132; 701/22
See application file for complete search history.

(56) References Cited

U.S. PATENT DOCUMENTS

| 5,304,912 | A | 4/1994 | Kajiwara et al. | |
|---|---|---|---|---|
| 5,780,980 | A | 7/1998 | Naito | |
| 6,775,115 | B2 * | 8/2004 | Sato | 361/23 |
| 6,966,803 | B2 * | 11/2005 | Hara et al. | 440/6 |
| 6,978,213 | B2 * | 12/2005 | Sato | 702/57 |
| 7,099,756 | B2 * | 8/2006 | Sato | 701/22 |
| 7,109,605 | B2 * | 9/2006 | Habu | 307/39 |
| 7,212,891 | B2 * | 5/2007 | Sato | 701/22 |
| 7,276,865 | B2 * | 10/2007 | Ochiai | 318/34 |

(Continued)

FOREIGN PATENT DOCUMENTS

EP    1 138 539    4/2001

(Continued)

*Primary Examiner*—Paul Ip
(74) *Attorney, Agent, or Firm*—Oliff & Berridge, PLC (57) ABSTRACT

When a torque command value from an external ECU is within a predetermined variation width, a control unit generates a signal and outputs the signal to a voltage command calculation unit so that electrostatic energy stored in a capacitor is kept at a predetermined threshold value or larger. Based on the signal, the voltage command calculation unit determines a target voltage of a voltage step-up converter that corresponds to a terminal-to-terminal voltage of the capacitor. In contrast, when the torque command value is out of the predetermined variation width, the control unit determines electric power to be supplied from a DC power supply to an inverter for allowing electric power to be supplied predominantly from the capacitor rather than from the DC power supply and outputs a signal. Based on this signal, the voltage command calculation unit determines the target voltage.

13 Claims, 7 Drawing Sheets

U.S. PATENT DOCUMENTS

| | | | |
|---|---|---|---|
| 2003/0081440 A1* | 5/2003 | Komatsu et al. | 363/132 |
| 2003/0117823 A1* | 6/2003 | Sato | 363/132 |
| 2003/0118876 A1* | 6/2003 | Sugiura et al. | 429/9 |
| 2004/0145338 A1* | 7/2004 | Nakamura et al. | 318/801 |
| 2004/0150365 A1* | 8/2004 | Ochiai | 318/801 |
| 2004/0222754 A1* | 11/2004 | Ochiai et al. | 318/105 |
| 2004/0228150 A1* | 11/2004 | Sato | 363/23 |
| 2005/0162023 A1* | 7/2005 | Habu | 307/151 |
| 2005/0254264 A1* | 11/2005 | Sidwell et al. | 362/655 |
| 2006/0055349 A1* | 3/2006 | Nakayama et al. | 318/254 |
| 2006/0067655 A1* | 3/2006 | Okuda et al. | 388/805 |
| 2006/0091836 A1* | 5/2006 | Oyobe et al. | 318/149 |
| 2006/0114702 A1* | 6/2006 | Yamada et al. | 363/132 |
| 2006/0119312 A1* | 6/2006 | Okamura et al. | 318/807 |
| 2006/0156096 A1* | 7/2006 | Sato | 714/724 |
| 2007/0029963 A1* | 2/2007 | Iura et al. | 318/811 |
| 2007/0108936 A1* | 5/2007 | Yaguchi | 318/800 |
| 2007/0165432 A1* | 7/2007 | Okamura et al. | 363/132 |

FOREIGN PATENT DOCUMENTS

| | | |
|---|---|---|
| EP | 1 138 539 A2 | 10/2001 |
| JP | A 5-260610 | 10/1993 |
| JP | A 8-223948 | 8/1996 |
| JP | A 8-240171 | 9/1996 |
| JP | A 9-240560 | 6/1997 |
| JP | B2 2879486 | 1/1999 |
| JP | A 2000-050401 | 2/2000 |
| JP | A 2001-211511 | 8/2001 |
| JP | A-2003-244801 | 8/2003 |
| JP | A 2004-056937 | 2/2004 |
| RU | 2 142 887 C1 | 12/1999 |
| SU | 1684106 A1 | 10/1991 |

* cited by examiner

MOTOR DRIVE APPARATUS

TECHNICAL FIELD

The present invention relates to a motor drive apparatus for driving a motor, and particularly to a motor drive apparatus capable of stably driving a motor even when a sudden change occurs in load.

BACKGROUND ART

Hybrid vehicles and electric vehicles have recently been of great interest as environment-friendly vehicles. A hybrid vehicle has, as its motive power sources, a DC (direct current) power supply, an inverter and a motor driven by the inverter in addition to a conventional engine. More specifically, the engine is driven to secure the motive power source and a DC voltage from the DC power supply is converted by the inverter into an AC (alternating current) voltage to be used for rotating the motor and thereby securing the motive power source as well.

An electric vehicle refers to a vehicle that has, as its motive power sources, a DC power supply, an inverter and a motor driven by the inverter.

Regarding the hybrid vehicle or electric vehicle, it has been proposed to boost the DC voltage from the DC power supply with a voltage step-up converter and supply the boosted DC voltage to the inverter which drives the motor (for example, Japanese Patent Laying-Open No. 09-240560, Japanese Patent No. 2879486, Japanese Patent Laying-Open Nos. 2000-050401 and 08-240171).

Japanese Patent Laying-Open No. 09-240560 for example discloses a power feeding apparatus for an electric-power-assisted vehicle, including a human-power drive system supplying a pedaling force to drive wheels, an electric-power drive system supplying an auxiliary force from an electric motor to the drive wheels and auxiliary force control means for variably controlling the auxiliary force according to the pedaling force and the vehicle speed, and further including voltage step-up means for boosting a battery voltage to a voltage according to an auxiliary force that is requested by the auxiliary force control means and smoothing means for smoothing the boosted voltage and supplying the smoothed voltage to the electric motor.

The voltage step-up means is thus used to boost the battery voltage to a voltage that is necessary for obtaining a target auxiliary force. Accordingly, the battery weight as well as the battery cost can be reduced.

The voltage boosted by the voltage step-up means is further smoothed by the smoothing means. Thus, output current values from the battery are averaged and accordingly the battery life can be extended.

Conventional motor drive apparatuses generally employ a DC-DC switching power supply, as voltage step-up means for boosting a battery voltage to a voltage according to a necessary auxiliary force. The DC-DC switching power supply performs its switching operation in response to a voltage command signal that is input from a control circuit so as to boost a voltage to a desired voltage and output the boosted voltage. Here, the voltage command signal that is input to the switching power supply is generated, by a control circuit, by calculating an auxiliary force to be generated by the electric-power drive system based on detection signals from a pedaling force sensor and a vehicle speed sensor to determine a target electric-current value necessary for obtaining the auxiliary force and variably control a requested voltage so that electric current flowing through the electric motor is at a target electric-current value.

Thus, a sudden increase or decrease of a required auxiliary force has to be immediately addressed by the switching power supply. Then, the control circuit is required to have a high-speed performance that is enough to address the sudden change in load. For satisfying this requirement, higher accuracy and larger size of the control circuit are indispensable, resulting in a new problem in terms of device size and cost.

DISCLOSURE OF THE INVENTION

The present invention has been made for solving the above-described problem and an object of the present invention is to provide a motor drive apparatus capable of supplying electric power in simple and stable manner even when a sudden change occurs in load.

According to the present invention, a motor drive apparatus includes: a drive circuit driving a motor; a voltage converter including a switching element and using a switching operation of the switching element for converting a DC voltage between a power supply and the drive circuit; a capacitor element provided between the voltage converter and the drive circuit for smoothing the converted DC voltage to input the smoothed DC voltage to the drive circuit; and a control circuit controlling the switching operation based on magnitude of a required output of the motor. The drive circuit is supplied with electric power, according to the required output of the motor, from the power supply and from the capacitor element. The control circuit controls the switching operation so that the electric power supplied from the capacitor element is larger than the electric power supplied from the power supply when the magnitude of the required output is out of a predetermined variation width.

Preferably, the control circuit males a determination as to whether the magnitude of the required output is within a range of the predetermined variation width and determines a target voltage of the switching operation according to result of the determination.

Preferably, the control circuit has a predetermined control width of the target voltage of the switching operation and sets, when the magnitude of the required output is out of the range of the predetermined variation width, the target voltage of the switching operation at a lower voltage level within a range of the predetermined control width.

Preferably, the predetermined control width of the target voltage of the switching operation has its upper limit and a voltage level corresponding to the upper limit is higher than a voltage level corresponding to an upper limit of the predetermined variation width of the magnitude of the required output.

Preferably, the motor drive apparatus further includes a voltage sensor detecting a terminal-to-terminal voltage of the capacitor element. When the terminal-to-terminal voltage of the capacitor element detected by the voltage sensor is lower than the target voltage of the switching operation, the control circuit controls the switching operation so that the terminal-to-terminal voltage of the capacitor element is equal to the target voltage of the switching operation.

Preferably, the motor drive apparatus further includes: a first electric-current sensor detecting a power-supply current input/output to/from the power supply; a second electric-current sensor detecting motor drive current for driving the motor; and a voltage sensor detecting a terminal-to-terminal voltage of the capacitor element. When the magnitude of the required output is out of the range of the predetermined variation width, the control circuit calculates the electric power supplied from the capacitor element based on the power supply current and the motor drive current detected respectively by the first electric-current sensor and the second electric-current sensor as well as the terminal-to-terminal voltage of the capacitor element detected by the voltage sensor, determines the electric power supplied from the power supply so that the electric power supplied from the power supply is smaller than the calculated electric power supplied from the capacitor element, and determines the target voltage of the switching operation as the terminal-to-terminal voltage of the capacitor element when the determined electric power is supplied from the power supply.

Preferably, when the magnitude of the required output is within the range of the predetermined variation width, the control circuit calculates stored electric power that is stored in the capacitor element based on the terminal-to-terminal voltage of the capacitor element that is detected by the voltage sensor and determines the target voltage of the switching operation so that the calculated stored electric power is at least a predetermined threshold value.

Preferably, the control circuit determines, when the stored electric power is smaller than the predetermined threshold value, the target voltage of the switching operation as the terminal-to-terminal voltage of the capacitor element when the stored electric power is equal to the predetermined threshold value.

Preferably, when the magnitude of the required output is out of the predetermined variation width, the predetermined threshold value has a level of the stored electric power that allows electric power to be supplied from the capacitor element to the drive circuit.

According to the present invention, when a required output that is required of the motor drive apparatus suddenly changes, electric power is supplied to the inverter predominantly from the capacitor element rather than the power supply. Accordingly, no highly-precise and large-sized control circuit for the voltage converter is necessary and any required output can be addressed simply and stably with a good response.

Further, for the capacitor element to store electrostatic energy of at least a predetermined threshold value, a target voltage of the switching operation of the voltage converter is determined. Accordingly, the capacitor element can be kept in a state that ensures supply of electric power in response to any required output.

BEST MODE FOR CARRYING OUT THE INVENTION

Embodiments of the present invention are hereinafter described in detail with reference to the drawings. In the drawings, like components are denoted by like reference characters and the description thereof is not repeated here.

First Embodiment

Figure 1:
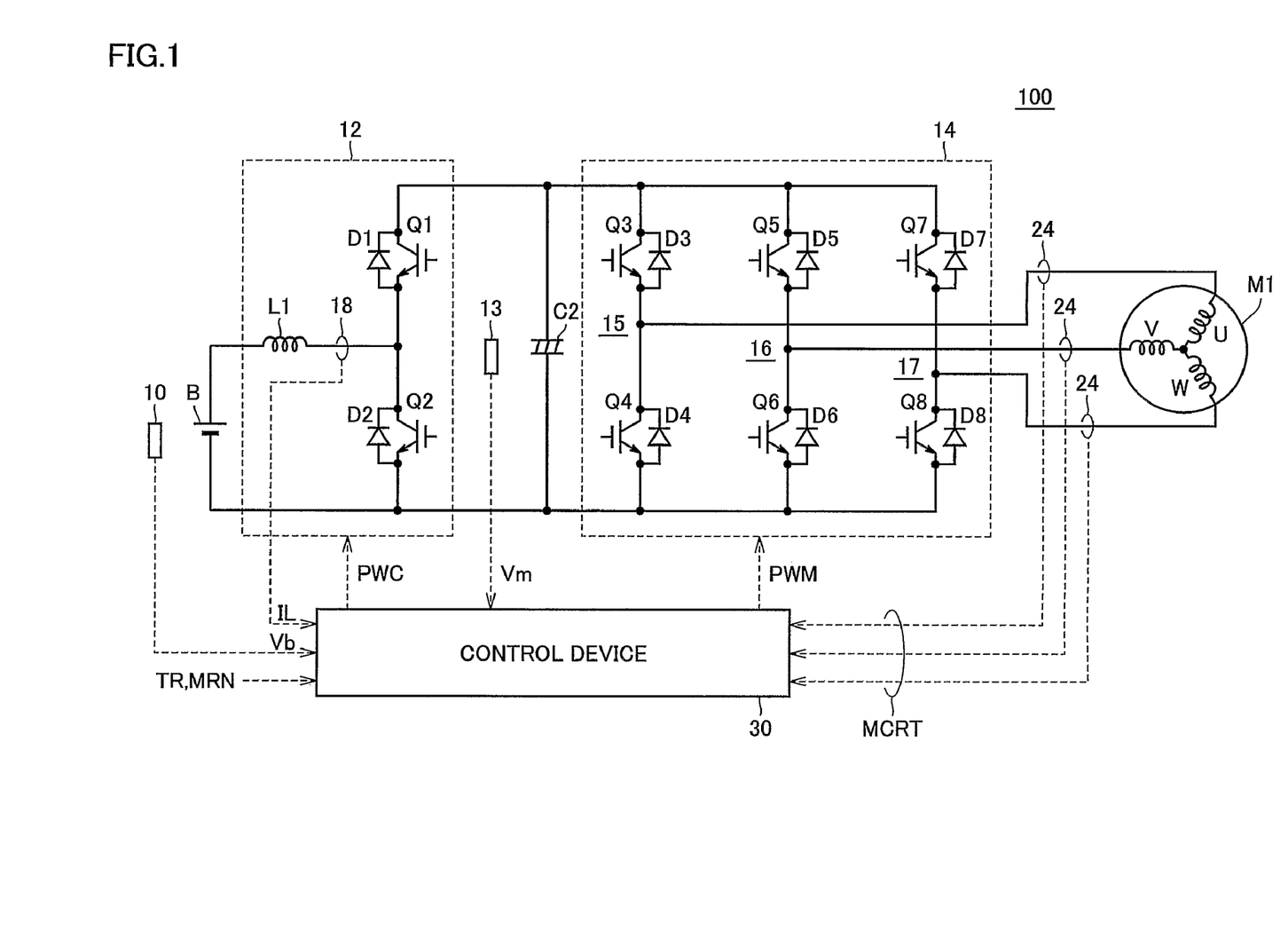
FIG. 1 is a schematic block diagram of a motor drive apparatus according to a first embodiment of the present invention.

FIG. 1 is a schematic block diagram of a motor drive apparatus according to a first embodiment of the present invention.

Referring to FIG. 1, motor drive apparatus 100 includes a DC power supply B, voltage sensors 10, 13, electric-current sensors 18, 24, a capacitor C2, a voltage step-up converter 12, an inverter 14, and a control device 30.

An AC motor M1 is a drive motor that generates torque for driving drive wheels of a hybrid vehicle or electric vehicle. AC motor M1 also serves as an electric generator driven by an engine and as an electric motor for the engine to start the engine for example.

Voltage step-up converter 12 includes a reactor L1, NPN transistors Q1, Q2 and diodes D1, D2.

One end of reactor L1 is connected to a power supply line of DC power supply B and the other end thereof is connected to an intermediate point between NPN transistor Q1 and NPN transistor Q2, namely between the emitter of NPN transistor Q1 and the collector of NPN transistor Q2.

NPN transistors Q1, Q2 are connected in series between the power supply line and a ground line. The collector of NPN transistor Q1 is connected to the power supply line while the emitter of NPN transistor Q2 is connected to the ground line. Between respective collectors and emitters of NPN transistors Q1, Q2, diodes D1, D2 are respectively provided for allowing electric current to flow from the emitter to the collector.

Inverter 14 includes a U phase arm 15, a V phase arm 16 and a W phase arm 17. U phase arm 15, V phase arm 16 and W phase arm 17 are provided in parallel between the power supply line and the ground line.

U phase arm 15 is comprised of NPN transistors Q3, Q4 connected in series, V phase arm 16 is comprised of NPN transistors Q5, Q6 connected in series, and W phase arm 17 is comprised of NPN transistors Q7, Q8 connected in series. Between respective collectors and emitters of NPN transistors Q3 to O8, diodes D3 to D8 for allowing current to flow from the emitter to the collector are connected respectively.

The intermediate point of each phase arm is connected to one end of a corresponding one of phase coils of AC motor M1. Specifically, AC motor M1 is a three-phase permanent-magnet motor and, one end of a U phase coil, one end of a V phase coil and one end of a W phase coil are connected at the common central junction, while the other end of the U phase coil is connected to an intermediate point between NPN transistors Q3, Q4, the other end of the V phase coil is connected to an intermediate point between NPN transistors Q5, Q6, and the other end of the W phase coil is connected to an intermediate point between NPN transistors Q7, Q8.

DC power supply B is comprised of secondary or rechargeable cell(s), for example, of nickel hydride or lithium ion. Voltage sensor 10 detects a voltage Vb that is output from DC power supply B to output the detected voltage Vb to control device 30.

Voltage step-up converter 12 boosts the DC voltage supplied from DC power supply B to provide the boosted voltage to capacitor C2. More specifically, receiving a signal PWC from control device 30, voltage step-up converter 12 boosts the DC voltage according to a period of time during which NPN transistor Q2 is turned on in response to signal PWC, and supplies the increased voltage to capacitor C2.

Further, receiving signal PWC from control device 30, voltage step-up converter 12 decreases a DC voltage supplied via capacitor C2 from inverter 14 to provide the resultant voltage to DC power supply B.

Capacitor C2 smoothes the DC voltage from voltage step-up converter 12 to supply the smoothed DC voltage to inverter 14. Capacitor C2 includes for example a capacitor having a large capacitance (electric double layer capacitor).

Voltage sensor 13 detects a terminal-to-terminal voltage Vm of capacitor C2 and outputs the detected voltage Vm to control device 30.

Receiving the DC voltage supplied from capacitor C2, inverter 14 converts the DC voltage into an AC voltage based on a signal PWM from control device 30 to drive AC motor M1. Accordingly, AC motor M1 is driven to generate torque specified by a torque command value TR.

In a regenerative braking mode of the hybrid vehicle or electric vehicle having motor drive apparatus 100 mounted thereon, inverter 14 converts an AC voltage generated by AC motor M1 into a DC voltage based on signal PWM from control device 30 to supply the resultant DC voltage to voltage step-up converter 12 via capacitor C2.

The regenerative braking here includes braking accompanied by regenerative power generation that is effected when a driver of the hybrid vehicle or electric vehicle steps on the foot brake as well as deceleration (or stop of acceleration) accompanied by regenerative power generation that is effected when the driver releases the accelerator pedal without operating the foot brake.

Electric-current sensor 18 detects reactor current IL flowing through reactor L1 to output the detected reactor current IL to control device 30.

Electric-current sensor 24 detects motor current MCRT flowing through AC motor M1 to output the detected motor current MCRT to control device 30.

Control device 30 receives, from an external ECU (Electrical Control Unit), torque command value TR and motor revolution number (number of revolutions of the motor) MRN, receives voltage Vm from voltage sensor 13, receives reactor current IL from electric-current sensor 18, and receives motor current MCRT from electric-current sensor 24. Further, control device 30 generates, based on voltage Vm, torque command value TR and motor current MCRT, signal PWM for controlling switching of NPN transistors Q3 to Q8 of inverter 14 when inverter 14 drives AC motor M1, according to a method hereinlater described, and outputs the generated signal PWM to inverter 14.

Moreover, when inverter 14 drives AC motor M1, control device 30 generates, based on voltages Vb, Vm, torque command value TR and motor revolution number MRN, signal PWC for controlling switching of NPN transistors Q1, Q2 of voltage step-up converter 12, according to a method hereinlater described, and outputs the generated signal PWC to voltage step-up converter 12.

Furthermore, in the regenerative braking mode of the hybrid vehicle or electric vehicle having motor drive apparatus 100 mounted thereon, control device 30 generates, based on voltage Vm, torque command value TR and motor current MCRT, signal PWM for converting an AC voltage generated by AC motor M1 into a DC voltage, and outputs the generated signal PWM to inverter 14. In this case, switching of NPN transistors Q3 to Q8 of inverter 14 is controlled by signal PWM. Accordingly, inverter 14 converts the AC voltage generated by AC motor M1 into the DC voltage and supplies the DC voltage to voltage step-up converter 12.

Further, in the regenerative braking mode, control device 30 generates, based on voltages Vb, Vm, torque command value TR and motor revolution number MRN, signal PWC for decreasing the DC voltage supplied from inverter 14, and outputs the generated signal PWC to voltage step-up converter 12. Thus, the AC voltage generated by AC motor M1 is converted into the DC voltage and decreased to be supplied to DC power supply B.

Figure 2:
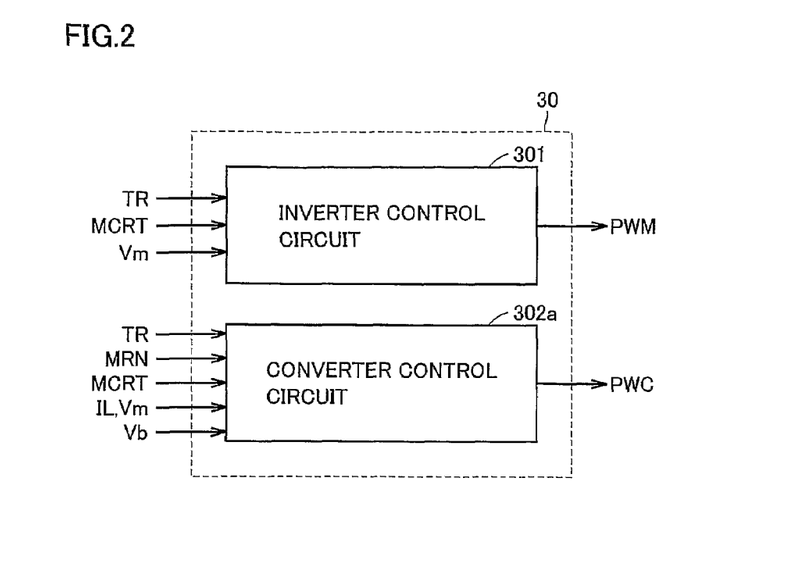
FIG. 2 is a block diagram of a control device in FIG. 1.

FIG. 2 is a block diagram of control device 30 in FIG. 1.

Referring to FIG. 2, control device 30 includes an inverter control circuit 301 and a converter control circuit 302a.

Inverter control circuit 301 generates, based on torque command value TR, motor current MCRT and voltage Vm, signal PWM for turning on/off NPN transistors Q3 to Q8 of inverter 14 when AC motor M1 is driven, and outputs the generated signal PWM to inverter 14.

Further, in the regenerative braking mode of the hybrid vehicle or electric vehicle having motor drive apparatus 100 mounted thereon, inverter control circuit 301 generates, based on torque command value TR, motor current MCRT and voltage Vm, signal PWM for converting the AC voltage generated by AC motor M1 into the DC voltage, and outputs the generated signal PWM to inverter 14.

Converter control circuit 302a generates, based on torque command value TR, voltages Vb, Vm and motor revolution number MRN, signal PWC for turning on/off NPN transistors Q1, Q2 of voltage step-up converter 12 when AC motor M1 is driven, and outputs the generated signal PWC to voltage step-up converter 12.

Further, converter control circuit 302a generates, in the regenerative braking mode of the hybrid vehicle or electric vehicle having motor drive apparatus 100 mounted thereon, based on torque command value TR, voltages Vb, Vm and motor revolution number MRN, signal PWC for decreasing the DC voltage from inverter 14, and outputs the generated signal PWC to voltage step-up converter 12.

Voltage step-up converter 12 can also use signal PWC for decreasing the DC voltage so as to decrease the voltage and thus has the function of a bidirectional converter.

Figure 3:
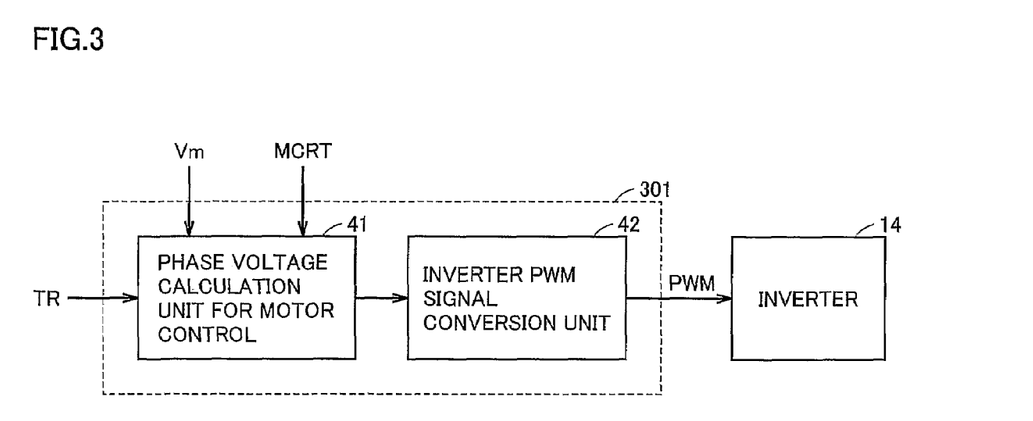
FIG. 3 is a block diagram of an inverter control circuit in FIG. 2.

FIG. 3 is a block diagram of inverter control circuit 301 in FIG. 2.

Referring to FIG. 3, inverter control circuit 301 includes a phase voltage calculation unit for motor control (hereinafter phase voltage calculation unit) 41 and an inverter PWM signal conversion unit 42.

Phase voltage calculation unit 41 receives from voltage sensor 13 an output voltage Vm of voltage step-up converter 12, namely receives an input voltage to be input to inverter 14, receives from electric-current sensor 24 motor current MCRT flowing through each phase of AC motor M1, and receives from the external ECU torque command value TR. Based on torque command value TR, motor current MCRT and voltage Vm, phase voltage calculation unit 41 calculates a voltage to be applied to the coil of each phase of AC motor M1 to output the resultant voltage to inverter PWM signal conversion unit 42.

Based on the result of the calculation provided from phase voltage calculation unit 41, inverter PWM signal conversion unit 42 generates signal PWM for actually turning on/off each of NPN transistors Q3 to Q8 of inverter 14 to output the generated signal PWM to each of NPN transistors Q3 to Q8.

Accordingly, switching of NPN transistors Q3 to Q8 of inverter 14 is controlled to control the current to be flown through each phase of AC motor M1 so that AC motor M1 outputs a specified torque. In this way, motor current MCRT is controlled and the motor torque is output according to torque command value TR.

Figure 4:
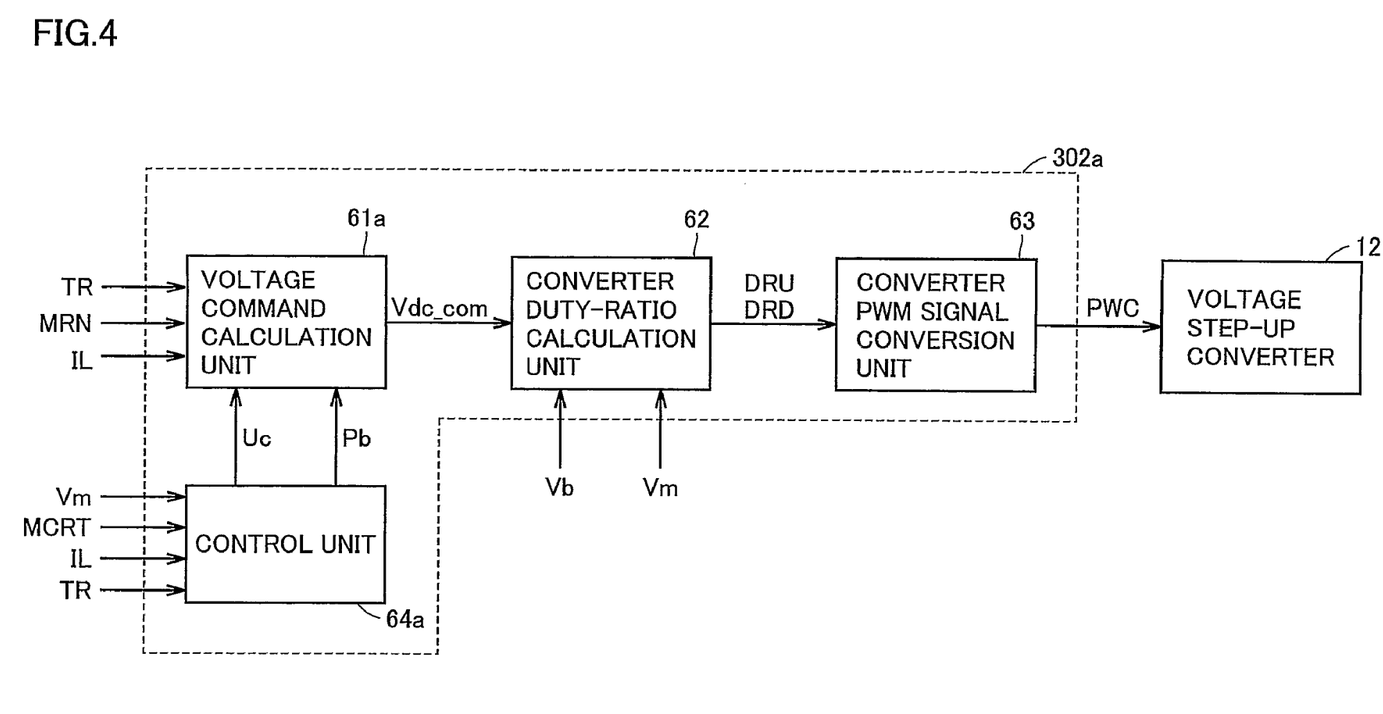
FIG. 4 is a block diagram of a converter control circuit in FIG. 2.

FIG. 4 is a block diagram of converter control circuit 302a in FIG. 2.

Referring to FIG. 4, converter control circuit 302a includes a voltage command calculation unit 61a, a converter duty-ratio calculation unit 62, a converter PWM signal conversion unit 63, and a control unit 64a.

Control unit 64a receives from voltage sensor 13 output voltage Vm of voltage step-up converter 12, namely receives an input voltage to be input to inverter 14, receives from electric-current sensor 24 motor current MCRT flowing through each phase of AC motor M1, receives from electric-current sensor 18 reactor current IL flowing through reactor L1, and receives torque command value TR from the external ECU.

Receiving torque command value TR, control unit 64a generates one of two different signals Uc, Pb according to the magnitude of the required torque, and outputs the generated signal to voltage command calculation unit 61a.

Specifically, control unit 64a has a predetermined variation width regarding torque command value TR, and determines whether or not torque command value TR from the external ECU is within a range of the variation width. The predetermined variation width is defined to cover variations of the required torque that is required of motor drive apparatus 100 in a normal operation mode. Therefore, in the normal operation mode, control unit 64a determines that torque command value TR is within this range of the variation width.

In contrast, when the required torque increases or decreases to be out of the variation width in the normal operation mode, torque command value TR is at least a threshold value representing the upper limit of the variation width or at most a threshold value representing the lower limit of the variation width. In this case, control unit 64a determines that torque command value TR is out of the range of the variation width.

In the following, a description is given of signals Uc, Pb generated by control unit 64a according to the result of the determination as to whether torque command value TR is within or out of the predetermined variation width.

When control unit 64a determines that torque command value TR is within the predetermined variation width, control unit 64a determines electrostatic energy Uc that is electric power accumulated in capacitor C2. Electrostatic energy Uc of capacitor C2 is represented by the following expression:

$$Uc = CVm^2/2 \qquad (1)$$

where C is capacitance of capacitor C2 and Vm is terminal-to-terminal voltage of capacitor C2.

Control unit 64a also has a predetermined threshold value Pcstd regarding electrostatic energy Uc of capacitor C2, and controls voltage step-up converter 12 so that the determined electrostatic energy Uc is kept at a value that is at least threshold value Pcstd. Predetermined threshold value Pcstd corresponds to an amount of accumulated electric power with which capacitor C2 can supply electric power to inverter 14 even when a sudden change occur in load, as discussed below.

Specifically, it is seen from expression (1) that electrostatic energy Uc is uniquely determined by terminal-to-terminal voltage Vm of capacitor C2. Thus, terminal-to-terminal voltage Vm of capacitor C2 is controlled so that electrostatic energy Uc has a value that is at least threshold value Pcstd. For this purpose, in view of the fact that terminal-to-terminal voltage Vm of capacitor C2 corresponds to the output voltage of voltage step-up converter 12, target voltage Vdc_com of output voltage Vm of voltage step-up converter 12 may be determined to satisfy the following relation:

$$Uc = C(Vdc\_com)^2/2 \geq Pcstd \qquad (2).$$

Here, electrostatic energy Uc of capacitor C2 has predetermined threshold value Pcstd for the following reason.

In a normal operation, voltage step-up converter 12 boosts a DC voltage supplied from DC power supply B and provides the boosted voltage to capacitor C2. Capacitor C2 smoothes the DC voltage that is output from voltage step-up converter 12 and provides the smoothed DC voltage to inverter 14.

At this time, voltage step-up converter 12 boosts the DC voltage according to a period of time during which NPN transistor Q2 is turned on in response to signal PWC from control device 30.

However, if the required torque suddenly changes to exceed the variation width of torque command value TR, fast switching control is necessary for voltage step-up converter 12. For fast switching control, a highly precise converter control circuit is necessary.

Then, in order to address the sudden change of the required torque, electric power may predominantly be supplied from capacitor C2 rather than DC power supply B so as to readily and stably supply electric power in response to any load requirements. In order to achieve this, capacitor C2 has to store desired electric power in advance for addressing the sudden change in load.

Accordingly, in this embodiment, threshold value Pcstd is defined as the level of electric power that allows capacitor C2 to supply electric power even when the load suddenly changes. Then, in order for electrostatic energy Uc of capacitor C2 to be at least threshold value Pcstd all the time, target voltage Vdc_com of voltage step-up converter 12 is determined.

In determining target voltage Vdc_com of voltage step-up converter 12, control unit 64a compares whether electrostatic energy Uc of capacitor C2 determined by expression (1) is larger or smaller than threshold value Pcstd. When electrostatic energy Uc is at least threshold value Pcstd, the determined value of electrostatic energy Uc is used as signal Uc to be output to voltage command calculation unit 61a. Receiving signal Uc, voltage command calculation unit 61a calculates target voltage Vdc_com based on torque command value TR and motor revolution number MRN.

In contrast, when electrostatic energy Uc of capacitor C2 is smaller than threshold value Pcstd, electrostatic energy Uc is set at threshold value Pcstd and the set value is used as signal Uc to be output to voltage command calculation unit 61a. Receiving signal Uc(=Pcstd), voltage command calculation unit 61a calculates target voltage Vdc_com that satisfies the following relation:

$$Uc = C(Vdc\_com)^2/2 = Pcstd \qquad (3).$$

While signal Uc is generated as detailed above, signal Pb is generated by control unit 64a in the following manner.

When control unit 64a determines that torque command value TR is out of the predetermined variation width, namely when any torque exceeding the variation width is required, control unit 64a determines target voltage Vdc_com of voltage step-up converter 12 so that electric power is predominantly supplied from capacitor C2 rather than DC power supply B to inverter 14.

More specifically, target voltage Vdc_com of voltage step-up converter 12 is determined so that electric power Pc supplied from capacitor C2 to inverter 14 is larger than electric power Pb supplied from DC power supply B via voltage step-up converter 12 to inverter 14 (=Pc>Pb).

Here, electric power Pc supplied from capacitor C2 to inverter 14 is represented by the following expression:

$$Pc = Vm \times (MCRT - ib) \quad (4)$$

where ib is current flowing through DC power supply B that is equal to reactor current IL detected by electric-current sensor 18. Further, the current flowing through capacitor C2 is equal to the difference determined by subtracting from motor drive current MCRT current ib flowing through DC power supply B. The current flowing through capacitor C2 may be determined using motor drive current MCRT detected by electric-current sensor 24 and reactor current IL detected by electric-current sensor 18.

Supplied electric power Pc which is supplied from capacitor C2 to inverter 14 that is determined by expression (4) is applied to the relation Pc>Pb. Then, supplied electric power Pb which is supplied from DC power supply B to inverter 14 is represented by the following relation:

$$Pb < Vm \times (MCRT - ib) \quad (5)$$

and thus Pb is determined. The determined Pb is provided as signal Pb to voltage command calculation unit 61a. Supplied electric power Pb from DC power supply B to inverter 14 is thus represented by the following expression:

$$Pb = ib \times Vdc\_com \quad (6).$$

Accordingly, voltage command calculation unit 61a calculates target voltage Vdc_com of voltage step-up converter 12 for supplying the determined electric power Pb.

As discussed above, according to the magnitude of torque command value TR, control unit 64a generates signals Uc, Pb of multiple patterns. Then, according to signals Uc, Pb, voltage command calculation unit 61a calculates target voltage Vdc_com of voltage step-up converter 12 of multiple patterns.

According to the above-described arrangement, when torque command value TR is within the predetermined variation width, capacitor C2 stores electrostatic energy Uc of at least threshold value Pcstd. Further, when torque command value TR varies to be out of the predetermined variation width, capacitor C2, rather than of DC power supply B, predominantly supplies electric power to inverter 14. Thus, for voltage step-up converter 12, no highly accurate switching control is required even when the load suddenly changes. Therefore, electric power can simply and stably be supplied with good response to inverter 14.

Then, target voltage Vdc_com calculated by voltage command calculation unit 61 a is output to converter duty-ratio calculation unit 62. Converter duty-ratio calculation unit 62 receives voltage Vb from voltage sensor 10, receives voltage Vm (=inverter input voltage) from voltage sensor 13 and receives target voltage Vdc_com from voltage command calculation unit 61a. Based on voltage Vb, converter duty-ratio calculation unit 62 calculates duty ratio DRU or DRD for setting inverter input voltage Vm at target voltage Vdc_com, and outputs the calculated duty ratio DRU or DRD to converter PWM signal conversion unit 63.

Thus, voltage Vb is to be boosted to allow inverter input voltage Vm to be target voltage Vdc_com. When inverter input voltage Vm is lower than target voltage Vdc_com, converter duty-ratio calculation unit 62 calculates duty ratio DRU for flowing DC current from DC power supply B to inverter 14 so that inverter input voltage Vm is equal to target voltage Vdc_com, and outputs the calculated duty ratio to converter PWM signal conversion unit 63. When inverter input voltage Vm is higher than target voltage Vdc_com, converter duty-ratio calculation unit 62 calculates duty ratio DRD for flowing DC current from inverter 14 to DC power supply B so that inverter input voltage Vm is equal to target voltage Vdc_com, and outputs the calculated duty ratio to converter PWM signal conversion unit 63. Thus, converter control circuit 302a performs feedback control to allow inverter input voltage Vm to be equal to target voltage Vdc_com.

Based on duty ratio DRU or DRD from converter duty-ratio calculation unit 62, converter PWM signal conversion unit 63 generates signal PWC for turning on/off NPN transistors Q1, Q2 of voltage step-up converter 12 and outputs the generated signal PWC to voltage step-up converter 12.

Figure 5:
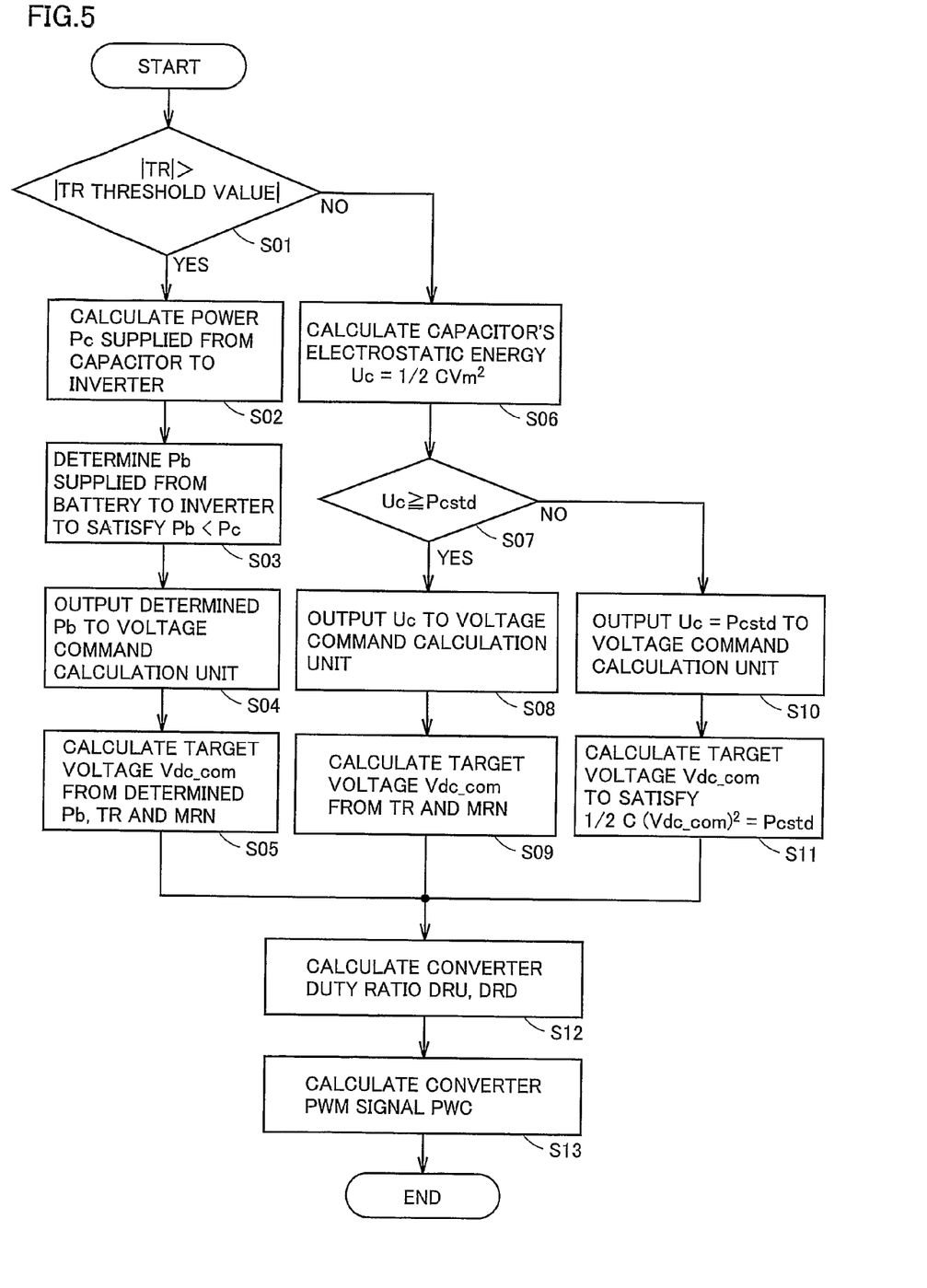
FIG. 5 is a flowchart illustrating an operation of the converter control circuit in the first embodiment.

FIG. 5 is a flowchart illustrating an operation of converter control circuit 302a in the first embodiment.

Referring to FIG. 5, receiving torque command value TR from the external ECU, control unit 64a determines whether or not the magnitude of torque command value TR (=|TR|) is within a variation width of torque command value TR (=|TR threshold value|) that is set in advance (step S01).

In step S01, when it is determined that torque command value TR is out of the pre-set variation width, control unit 64a calculates supplied electric power Pc to be supplied from capacitor C2 to inverter 14 (step S02). Specifically, terminal-to-terminal voltage Vm of capacitor C2 detected by voltage sensor 13 as well as motor drive current MCRT and reactor current IL (=ib) detected respectively by electric-current sensors 24, 18 are substituted into expression (4) to determine supplied power Pc to be supplied from capacitor C2 to inverter 14.

Then, based on the calculated electric power Pc to be supplied from capacitor C2 to inverter 14, control unit 64a determines supplied electric power Pb to be supplied from DC power supply B to inverter 14 (step S03). At this time, supplied electric power Pb to be supplied from DC power supply B to inverter 14 is determined so that electric power Pb is smaller than electric power Pc to be supplied from capacitor C2 to inverter 14. The determined electric power Pb to be supplied from DC power supply B to inverter 14 is output as signal Pb to voltage command calculation unit 61a (step S04).

Receiving the determined electric power Pb to be supplied from DC power supply B to inverter 14, voltage command calculation unit 61 a substitutes the detected reactor current IL (=ib) into expression (6) to calculate target voltage Vdc_com (step S05).

Returning to step S01, when it is determined that torque command value TR is within the predetermined variation width, control unit 64a calculates electrostatic energy Uc stored in capacitor C2 (step S06). Electrostatic energy Uc of capacitor C2 is determined by substituting capacitance C and terminal-to-terminal voltage Vm of capacitor C2 into expression (1).

Then, control unit 64a compares the determined electrostatic energy Uc of capacitor C2 with predetermined threshold value Pcstd to determine which is larger (step S07).

In step S07, when electrostatic energy Uc of capacitor C2 is at least threshold value Pcstd, the determined electrostatic energy Uc is output as signal Uc to voltage command calculation unit 61a (step S08).

Receiving signal Uc, voltage command calculation unit 61*a* calculates target voltage Vdc_com based on torque command value TR and motor revolution number MRN from the external ECU (step S09).

In step S07, when electrostatic energy Uc of capacitor C2 is smaller than threshold value Pcstd, threshold value Pcstd is output as signal Uc to voltage command calculation unit 61*a* (step S10).

Receiving signal Uc, voltage command calculation unit 61*a* calculates target voltage Vdc_com so that the relation Pcstd=C (Vdc_com)$^2$/2 is satisfied (step S11).

Further, when target voltage Vdc_com calculated in steps S05, S09, S11 each according to the magnitude of torque command value TR is output to converter duty-ratio calculation unit 62, duty ratio DRU or DRD is calculated so that inverter input voltage Vm is equal to target voltage Vdc_com (step S12).

When the calculated duty ratio DRU or DRD is output to converter PWM signal conversion unit 63, signal PWC is generated based on the duty ratio (step S13). The generated signal PWC is output to NPN transistors Q1, Q2 of voltage step-up converter 12.

Further, in step S01 of FIG. 5, when it is confirmed that torque command value TR, which showed a sudden change, now changes within the predetermined variation width, electrostatic energy Uc of at least threshold value Pcstd is again stored in capacitor C2 according to the operation through steps S06 to S11. In this way, any sudden change of torque command value TR that could occur in a subsequent stage can promptly be addressed.

Although the present embodiment has been described in connection with the configuration for controlling the means for supplying electric power to the load according to the magnitude of torque command value TR, the means for supplying electric power may be controlled according to a required output (electric power).

As discussed above, according to the first embodiment of the present invention, upon occurrence of a sudden change of the required torque of motor drive apparatus 100, electric power is supplied predominantly from the capacitor element rather than the power supply. Therefore, no high-precision and large-sized control circuit for the voltage converter is necessary and thus any required torque can be addressed simply and stably with good response.

Further, in order for electrostatic energy of at least a predetermined threshold value to be stored in the capacitor element, a target voltage for the switching operation of the voltage converter is determined. Accordingly, electric power can surely be supplied from the capacitor element in response to any required torque that suddenly changes.

Second Embodiment

The above-proposed structure of the motor drive apparatus in the first embodiment is used to control target voltage Vdc_com of voltage step-up converter 12 according to the magnitude of torque command value TR and supply electric power predominantly from capacitor C2 in response to any sudden change in load, thereby simply and stably supplying electric power. In this case, target voltage Vdc_com of voltage step-up converter 12 is controlled in variable manner under the condition that a predetermined relation is satisfied. In the present embodiment, a manner of control of target voltage Vdc_com of voltage step-up converter 12 is further described. It is noted that a motor drive apparatus of the present embodiment is basically identical in structure to the motor drive apparatus shown in FIG. 1 and the detailed description of the structure of the whole apparatus is not repeated here.

Figure 6:
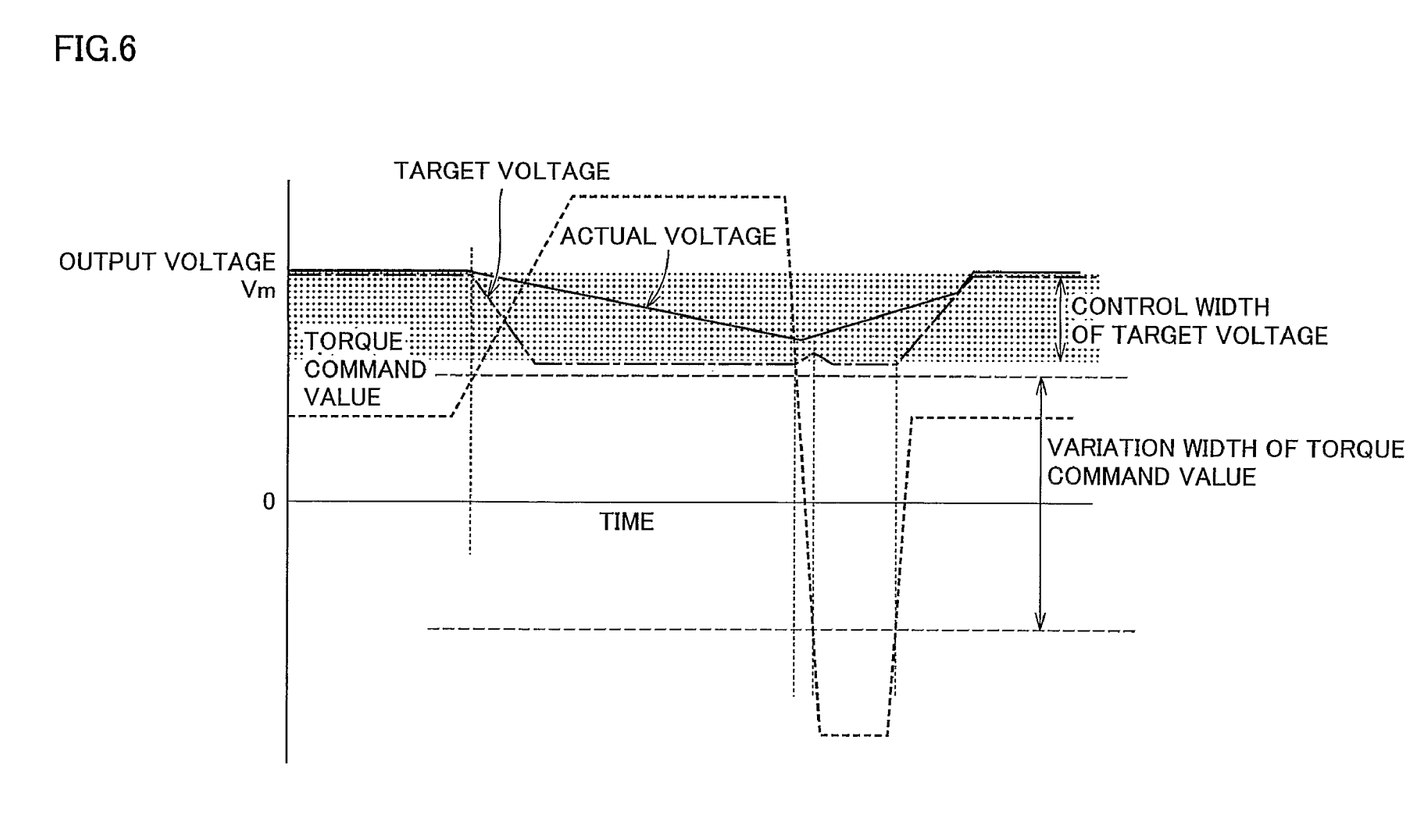
FIG. 6 illustrates the principle of a control operation of a converter control circuit mounted on a motor drive apparatus according to a second embodiment of the present invention.

FIG. 6 illustrates the principle of a control operation of voltage step-up converter 12 mounted on the motor drive apparatus in the second embodiment of the present invention.

Specifically, FIG. 6 shows a relation between output voltage Vm of voltage step-up converter 12 and torque command value TR. As indicated by the dotted line in FIG. 6, torque command value TR is represented by a waveform that varies according to the state of a vehicle. In FIG. 6, a predetermined variation width of this torque command value TR is set. The predetermined variation width is set, as done in the first embodiment, so that a sudden change in load can be identified.

Voltage step-up converter 12 boosts a DC voltage from DC power supply B and outputs the boosted voltage to capacitor C2. Here, for the voltage step-up operation of voltage step-up converter 12, target voltage Vdc_com specifying the level which should be attained by the boosted voltage is set by a converter control circuit 302*b* within control device 30 that is described hereinlater.

In this embodiment, target voltage Vdc_com has a predetermined control width as shown in FIG. 6 and the target voltage Vdc_com is a variable value within this range. In particular, the upper limit of the control width of target voltage Vdc_com is set higher than the upper limit of the threshold value of torque command value TR. This is for the following reason. In view of the fact that output voltage Vm of voltage step-up converter 12 is the terminal-to-terminal voltage of capacitor C2, the target voltage Vdc_com is set relatively high for allowing electrostatic energy Uc to be stored in capacitor C2 for addressing any sudden change in load. Here, target voltage Vdc_com is set to have some allowance with respect to the breakdown voltage of capacitor C2 in consideration of electric charging through a regenerative braking operation.

In the following, control of target voltage Vdc_com of voltage step-up converter 12 is described.

When torque command value TR is within the predetermined variation width, target voltage Vdc_com is set as done in the first embodiment so that electrostatic energy Uc of capacitor C2 is kept at a value which is at least predetermined threshold value Pcstd. Specifically, in order to allow the electrostatic energy of capacitor C2 to be kept at predetermined threshold Pcstd or higher, terminal-to-terminal voltage Vm of capacitor C2 is determined at which target voltage Vdc_com of voltage step-up converter 12 is set.

At this time, as shown in FIG. 6, target voltage Vdc_com may be set at a voltage level equal to the upper limit of the control width for example. Target voltage Vdc_com is thus set higher than the variation width of torque command value TR to allow the DC voltage output from voltage step-up converter 12 to be supplied to inverter 14 and to be used for charging capacitor C2.

When torque command value TR suddenly changes to exceed the threshold value that is the upper limit of the variation width of torque command value TR as shown in FIG. 6, target voltage Vdc_com is set at a lower voltage level within the range of the control width. In FIG. 6, target voltage Vdc_com is lowered to the level of the lower limit of the control width.

When target voltage Vdc_com is lowered, voltage step-up converter 12 has its voltage step-up operation suppressed or stopped. On the other hand, electrostatic energy Uc stored in capacitor C2 is supplied to inverter 14 so that the required torque is generated. As target voltage Vdc_com is lowered, the switching operation of voltage step-up converter 12 is suppressed or stopped. Then, the output voltage (actual voltage) of voltage step-up converter 12 that is indicated by the solid line in FIG. 6 decreases.

When torque command value TR is again within the predetermined variation width, target voltage Vdc_com is increased from the lower-limit level to the upper-limit level as shown in FIG. 6. When target voltage Vdc_com becomes higher than the actual voltage, the switching control of voltage step-up converter 12 is started to resume the voltage step-up operation.

Figure 7:
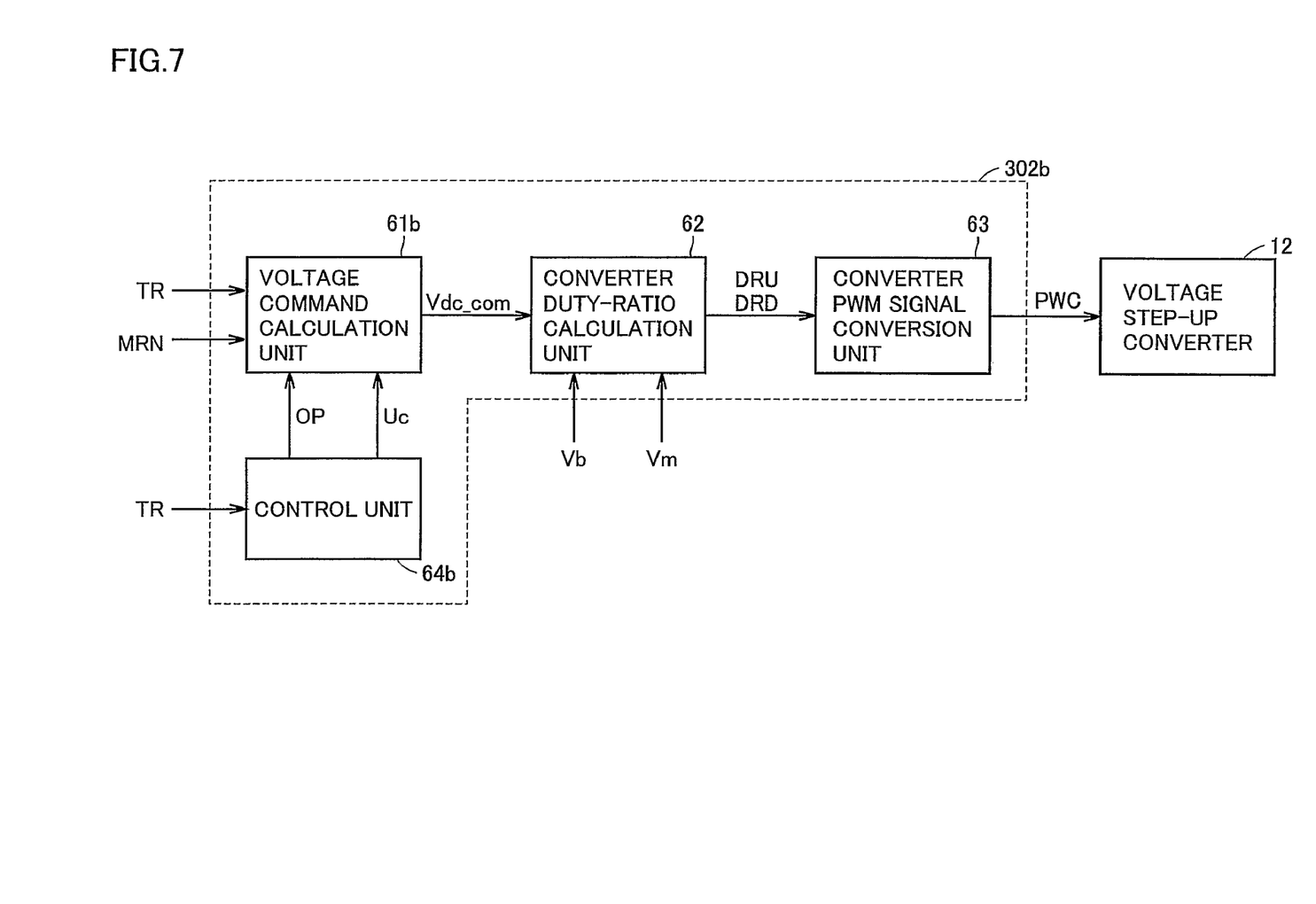
FIG. 7 is a block diagram showing a configuration of the converter control circuit for controlling a target voltage of a voltage step-up converter shown in FIG. 6.

FIG. 7 is a block diagram showing a configuration of a converter control circuit for controlling target voltage Vdc_com of voltage step-up converter 12 shown in FIG. 6.

Referring to FIG. 7, converter control circuit 302b includes a voltage command calculation unit 61b, a converter duty-ratio calculation unit 62, a converter PWM signal conversion unit 63, and a control unit 64b.

Control unit 64b receives torque command value TR from an external ECU (not shown). Receiving torque command value TR, control unit 64b generates one of two different signals OP, Uc according to the magnitude of the torque command value. The generated one of OP, Uc is output to voltage command calculation unit 61b.

Specifically, control unit 64b has a predetermined variation width regarding torque command value TR, and determines whether or not torque command value TR from the external ECU is within this range of the variation width. The predetermined variation width is defined to cover variations of required torque that is required of motor drive apparatus 100 in a normal operation. Therefore, in the normal operation, control unit 64b determines that torque command value TR is within this range of the variation width.

In contrast, when the required torque increases or decreases to exceed the range of the variations in the normal operation, torque command value TR should be a value that is at least a threshold value representing the upper limit of the variation width or at most a threshold value representing the lower limit of the variation width. In this case, control unit 64b determines that torque command value TR is out of the range of the variation width.

In the following, a description is given of signals OP, Pc generated by control unit 64b according to the result of the determination as to whether torque command value TR is within or out of the predetermined variation width.

When control unit 64b determines that torque command value TR is within the predetermined variation width, control unit 64b determines electrostatic energy Uc that is electric power accumulated in capacitor C2, according to the above-described expression (1).

As in the first embodiment, control unit 64b has predetermined threshold value Pcstd regarding electrostatic energy Uc of capacitor C2 and controls the electrostatic energy so that electrostatic energy Uc is kept at a value that is at least threshold value Pcstd. Specifically, terminal-to-terminal voltage Vm of capacitor C2 is controlled so that electrostatic energy Uc is equal to or higher than threshold value Pcstd. In other words, since terminal-to-terminal voltage Vm of capacitor C2 corresponds to the output voltage of voltage step-up converter 12, target voltage Vdc_com of voltage step-up converter 12 is determined so that the relation Uc≧Pcstd is satisfied.

Then, when electrostatic energy Uc of capacitor C2 is at least threshold value Pcstd, control unit 64b outputs the determined electrostatic energy Uc as signal Uc to voltage command calculation unit 61b. In contrast, when electrostatic energy Uc of capacitor C2 is smaller than threshold value Pcstd, threshold value Pcstd is output as signal Uc to voltage command calculation unit 61b.

When control unit 64b determines that torque command value TR is out of the predetermined variation width, signal OP indicating the result of the determination is output to voltage command calculation unit 61b.

Receiving signal Uc or OP, voltage command calculation unit 61b calculates target voltage Vdc_com appropriate for the signal. More specifically, receiving signal Uc indicating that electrostatic energy Uc of capacitor C2 is larger than threshold value Pcstd, voltage command calculation unit 61b calculates target voltage Vdc_com based on torque command value TR and motor revolution number MRN.

Receiving signal Uc indicating that electrostatic energy Uc of capacitor C2 is equal to threshold value Pcstd, voltage command calculation unit 61b calculates target voltage Vdc_com that satisfies expression (3).

In contrast, receiving signal OP indicating that the load suddenly changes, voltage command calculation unit 61b sets target voltage Vdc_com of voltage step-up converter 12 at the lower-limit level of the control width so that electric power is predominantly supplied from capacitor C2 rather than DC power supply B to inverter 14.

As discussed above, according to the magnitude of torque command value TR, control unit 64b generates signals Uc, OP of multiple patterns. According to signals Uc, OP, voltage command calculation unit 61b calculates target voltage Vdc_com of voltage step-up converter 12 of multiple patterns. Thus, when torque command value TR is within the predetermined variation width, electrostatic energy Uc of at least threshold value Pcstd is stored in capacitor C2. When torque command value TR varies to exceed the predetermined variation width, electric power is predominantly supplied from capacitor C2 to inverter 14. Thus, even when a sudden change in load occurs, electric power is simply and stably supplied to inverter 14. Target voltage Vdc_com calculated by voltage command calculation unit 61b is output to converter duty-ratio calculation unit 62.

Converter duty-ratio calculation unit 62 receives voltage Vb from voltage sensor 10, receives voltage Vm(=inverter input voltage) from voltage sensor 13 and receives target voltage Vdc_com from voltage command calculation unit 61b. Based on voltage Vb, converter duty-ratio calculation unit 62 calculates duty ratio DRU or DRD for setting inverter input voltage Vm at target voltage Vdc_com and outputs the calculated duty ratio DRU or DRD to converter PWM signal conversion unit 63.

Voltage Vb is to be boosted to allow inverter input voltage Vm to be at target voltage Vdc_com. When inverter input voltage Vm is lower than target voltage Vdc_com, converter duty-ratio calculation unit 62 calculates duty ratio DRU for flowing DC current from DC power supply B to inverter 14 so that inverter input voltage Vm is equal to target voltage Vdc_com, and outputs the calculated duty ratio to converter PWM signal conversion unit 63. When inverter input voltage Vm is higher than target voltage Vdc_com, converter duty-ratio calculation unit 62 calculates duty ratio DRD for flowing the DC current from inverter 14 to DC power supply B so that inverter input voltage Vm is equal to target voltage Vdc_com, and outputs the calculated duty ratio to converter PWM signal conversion unit 63. Thus, converter control circuit 302b performs feedback control to allow inverter input voltage Vm to be equal to target voltage Vdc_com.

Based on duty ratio DRU or DRD from converter duty-ratio calculation unit 62, converter PWM signal conversion unit 63 generates signal PWC for turning on/off NPN transistors Q1, Q2 of voltage step-up converter 12 and outputs the generated signal PWC to voltage step-up converter 12.

Figure 8:
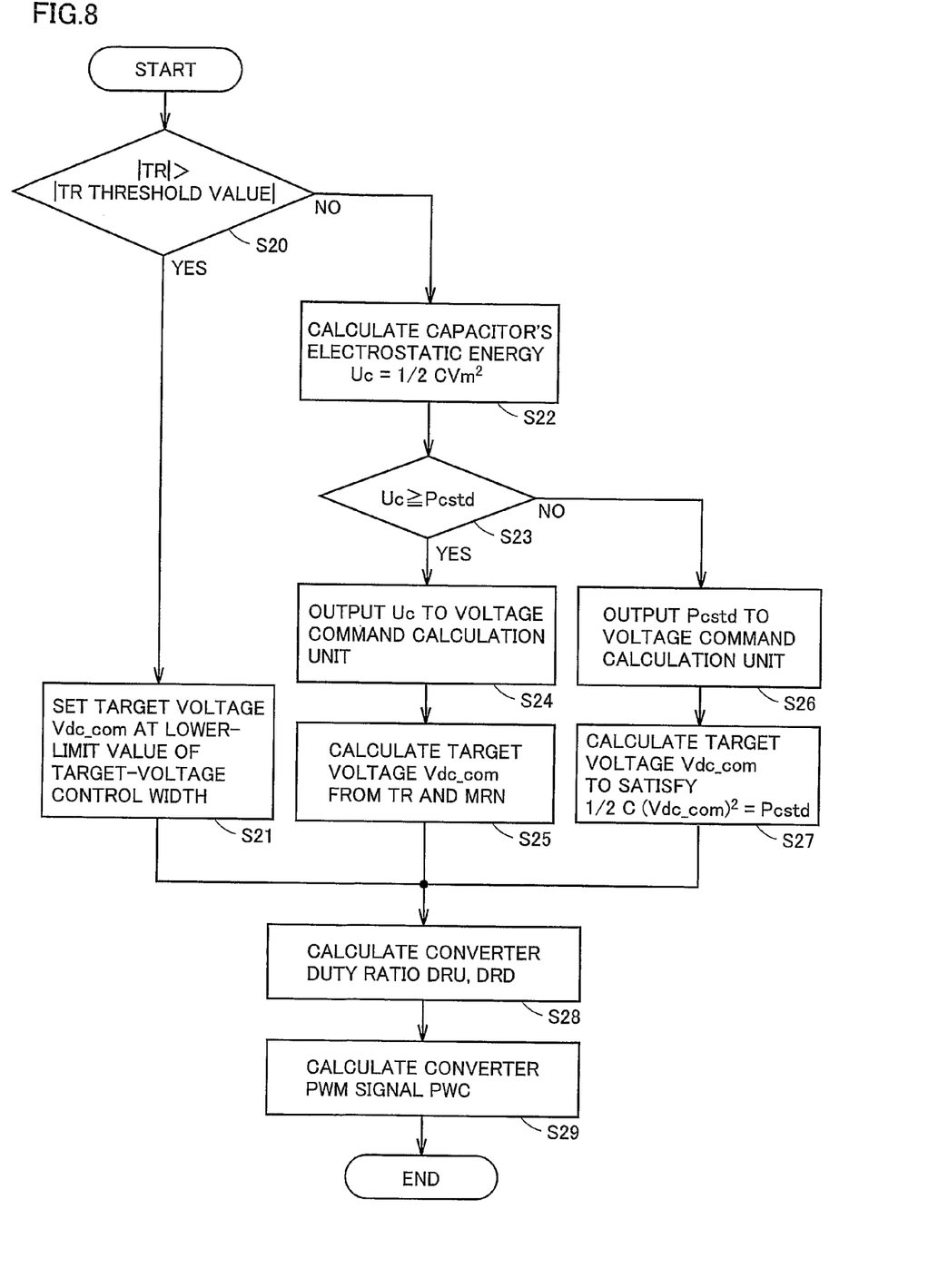
FIG. 8 is a flowchart illustrating an operation of the converter control circuit in the second embodiment.

FIG. 8 is a flowchart for illustrating an operation of converter control circuit 302b in the second embodiment.

Referring to FIG. 8, receiving torque command value TR from the external ECU, control unit 64b determines whether or not the magnitude of torque command value TR (=|TR|) is within a variation width of torque command value TR (=|TR threshold value|) that is set in advance (step S20).

In step S20, when it is determined that torque command value TR is out of the predetermined variation width, signal OP indicating the result of the determination is output to voltage command calculation unit 61b. According to signal OP, voltage command calculation unit 61b sets target voltage Vdc_com at the lower-limit level of the control width of target voltage Vdc_com (step S21).

In step S20, when it is determined that torque command value TR is within the predetermined variation width, control unit 64b calculates electrostatic energy Uc of capacitor C2 (step S22). Electrostatic energy Uc of capacitor C2 is determined using expression (1) from capacitance C and terminal-to-terminal voltage Vm of capacitor C2.

Then, control unit 64b compares the determined electrostatic energy Uc of capacitor C2 with predetermined threshold value Pcstd to determine which is larger (step S23).

In step S07, when electrostatic energy Uc of capacitor C2 is at least threshold value Pcstd, the determined electrostatic energy Uc is output as signal Uc to voltage command calculation unit 61b (step S24).

Receiving signal Uc, voltage command calculation unit 61b calculates target voltage Vdc_com based on torque command value TR and motor revolution number MRN from the external ECU (step S25).

In step S23, when electrostatic energy Uc of capacitor C2 is smaller than threshold value Pcstd, threshold value Pcstd is output as signal Uc to voltage command calculation unit 61b (step S26).

Receiving signal Uc, voltage command calculation unit 61b calculates target voltage Vdc_com so that the relation Pcstd=C(Vdc_com)$^2$/2 is satisfied (step S27).

Further, when target voltage Vdc_com that is calculated in steps S21, S25, S27 each according to the magnitude of torque command value TR is output to converter duty ratio calculation unit 62, duty ratio DRU or DRD is calculated for allowing inverter input voltage Vm to be equal to target voltage Vdc_com (step S28).

When the calculated duty ratio DRU or DRD is output to converter PWM signal conversion unit 63, signal PWC is generated based on the duty ratio (step S29). The generated signal PWC is output to NPN transistors Q1, Q2 of voltage step-up converter 12.

As heretofore discussed, according to the second embodiment of the present invention, a motor drive apparatus can be implemented that is capable of supplying electric power in simple and stable manner without a complicated circuit configuration even when a sudden load change occurs.

INDUSTRIAL APPLICABILITY

The present invention is applicable to a motor drive apparatus mounted on a motor vehicle.

The invention claimed is:

1. A motor drive apparatus comprising:
   a drive circuit driving a motor;
   a voltage converter including a switching element and using a switching operation of said switching element for converting a DC voltage between a power supply and said drive circuit;
   a capacitor element provided between said voltage converter and said drive circuit for smoothing the converted DC voltage to input the smoothed DC voltage to said drive circuit; and
   a control circuit controlling said switching operation based on magnitude of a required output of said motor, wherein
   said drive circuit is supplied with electric power, according to the required output of said motor, from said power supply and from said capacitor element, and
   said control circuit controls said switching operation so that the electric power supplied from said capacitor element to said drive circuit is larger than the electric power supplied from said power supply to said drive circuit when the magnitude of said required output is out of a predetermined variation width.

2. The motor drive apparatus according to claim 1, wherein
   said control circuits makes a determination as to whether the magnitude of said required output is within a range of said predetermined variation width and determines a target voltage of said switching operation according to result of the determination.

3. The motor drive apparatus according to claim 2, wherein
   said control circuit has a predetermined control width of the target voltage of said switching operation and sets, when the magnitude of said required output is out of the range of said predetermined variation width, the target voltage of said switching operation at a lower voltage level within a range of said predetermined control width.

4. The motor drive apparatus according to claim 3, wherein
   said predetermined control width of the target voltage of said switching operation has its upper limit and a voltage level corresponding to the upper limit is higher than a voltage level corresponding to an upper limit of said predetermined variation width of the magnitude of said required output.

5. The motor drive apparatus according to claim 4, further comprising a voltage sensor detecting a terminal-to-terminal voltage of said capacitor element, wherein
   when the terminal-to-terminal voltage of said capacitor element detected by said voltage sensor is lower than the target voltage of said switching operation, said control circuit controls said switching operation so that the terminal-to-terminal voltage of said capacitor element is equal to the target voltage of said switching operation.

6. The motor drive apparatus according to claim 2, further comprising:
   a first electric-current sensor detecting a power-supply current input/output to/from said power supply;
   a second electric-current sensor detecting motor drive current for driving said motor; and
   a voltage sensor detecting a terminal-to-terminal voltage of said capacitor elements, wherein
   when the magnitude of said required output is out of the range of said predetermined variation width, said control circuit calculates the electric power supplied from said capacitor element based on said power supply current and said motor drive current detected respectively by said first electric-current sensor and said second electric-current sensor as well as the terminal-to-terminal voltage of said capacitor element detected by said voltage sensor, determines the electric power supplied from said power supply so that the electric power supplied from said power supply is smaller than said calculated electric power supplied from said capacitor element, and determines the target voltage of said switching operation as the terminal-to-terminal voltage of said capacitor element when the determined electric power is supplied from said power supply.

7. The motor drive apparatus according to claim 6, wherein when the magnitude of said required output is within the range of said predetermined variation width, said control circuit calculates stored electric power that is stored in said capacitor element based on the terminal-to-terminal voltage of said capacitor element that is detected by said voltage sensor and determines the target voltage of said switching operation so that said calculated stored electric power is at least a predetermined threshold value.

8. The motor drive apparatus according to claim 7, wherein said control circuit determines, when said stored electric power is smaller than said predetermined threshold value, the target voltage of said switching operation as the terminal-to-terminal voltage of said capacitor element when said stored electric power is equal to said predetermined threshold value.

9. The motor drive apparatus according to claim 8, wherein when the magnitude of said required output is out of said predetermined variation width, said predetermined threshold value has a level of the stored electric power that allows electric power to be supplied from said capacitor element to said drive circuit.

10. The motor drive apparatus according to claim 3, further comprising:
a first electric-current sensor detecting a power-supply current input/output to/from said power supply;
a second electric-current sensor detecting motor drive current for driving said motor; and
a voltage sensor detecting a terminal-to-terminal voltage of said capacitor element, wherein
when the magnitude of said required output is out of the range of said predetermined variation width, said control circuit calculates the electric power supplied from said capacitor element based on said power supply current and said motor drive current detected respectively by said first electric-current sensor and said second electric-current sensor as well as the terminal-to-terminal voltage of said capacitor element detected by said voltage sensor, determines the electric power supplied from said power supply so that the electric power supplied from said power supply is smaller than said calculated electric power supplied from said capacitor element, and determines the target voltage of said switching operation as the terminal-to-terminal voltage of said capacitor element when the determined electric power is supplied from said power supply.

11. The motor drive apparatus according to claim 10, wherein
when the magnitude of said required output is within the range of said predetermined variation width, said control circuit calculates stored electric power that is stored in said capacitor element based on the terminal-to-terminal voltage of said capacitor element that is detected by said voltage sensor and determines the target voltage of said switching operation so that said calculated stored electric power is at least a predetermined threshold value.

12. The motor drive apparatus according to claim 11, wherein
said control circuit determines, when said stored electric power is smaller than said predetermined threshold value, the target voltage of said switching operation as the terminal-to-terminal voltage of said capacitor element when said stored electric power is equal to said predetermined threshold value.

13. The motor drive apparatus according to claim 12, wherein
when the magnitude of said required output is out of said predetermined variation width, said predetermined threshold value has a level of the stored electric power that allows electric power to be supplied from said capacitor element to said drive circuit.

* * * * *